United States Patent Office 2,789,550
Patented Apr. 23, 1957

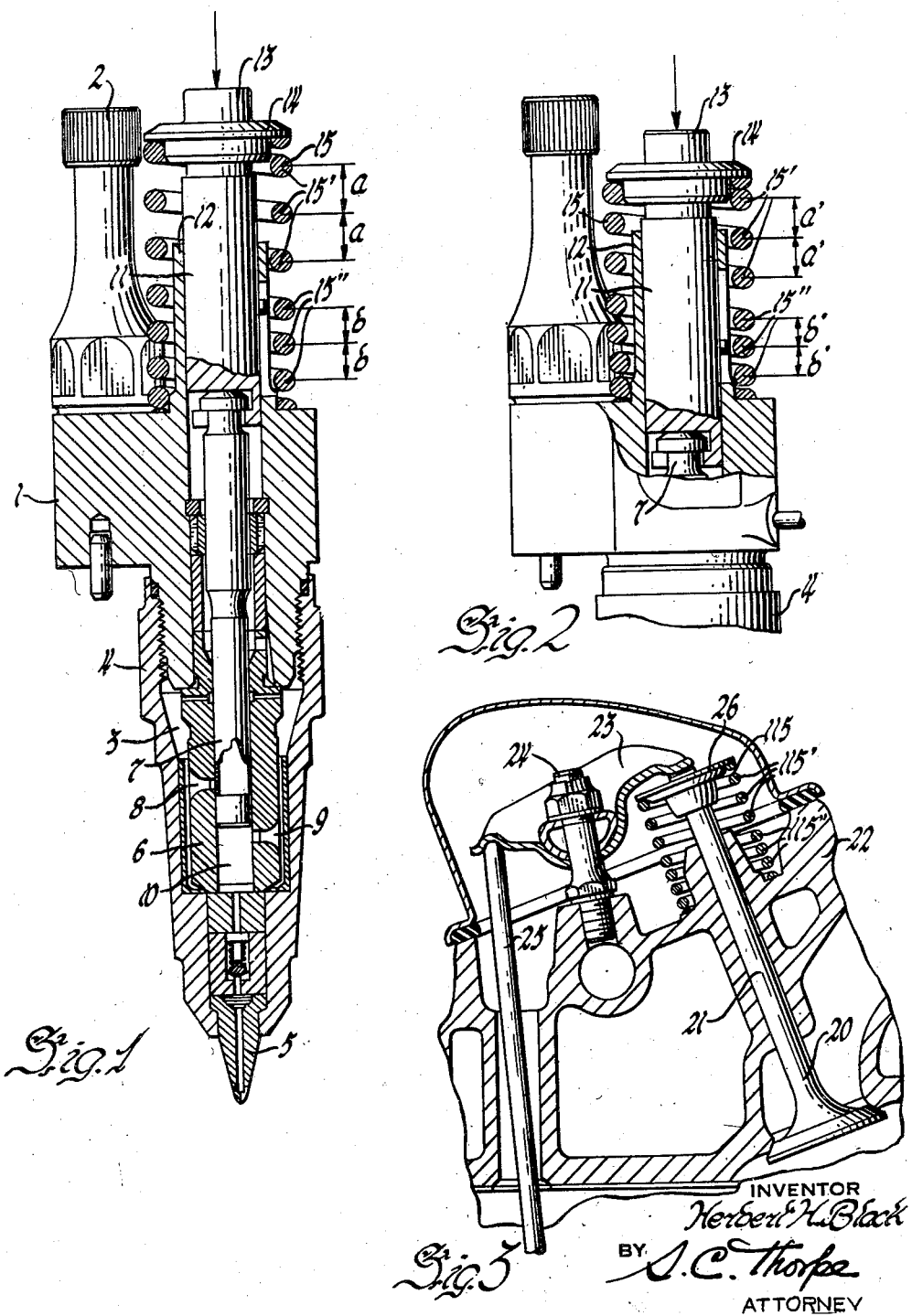

2,789,550

ANTI-SURGE SPRING MEANS

Herbert H. Black, Grand Rapids, Mich., assignor to General Motors Corporation, Detroit, Mich., a corporation of Delaware Application January 31, 1955, Serial No. 485,115

7 Claims. (Cl. 123—39)

This invention relates to spring actuated reciprocating elements such as pump plungers, poppet valves, etc., as used in internal combustion engines and the like, and particularly to the improvement in the spring means thereof for damping or preventing surge resulting from resonant vibration within the operating speed range.

In the prior art it has been a common expedient in preventing surge of coil springs to employ frictional damping devices which rub on the spring coils or convolutions during spring flexure, and to use two springs in parallel thrust which have different load deflection rates for the same purpose. I have found that this problem of surge can be eliminated without the use of such secondary devices by providing a spring having at least two resilient portions in series thrust with each other and of respectively different load deflection rates. For such purpose, each different rate resilient portion must be operatively active throughout the reciprocatory stroke of the plunger, valve or other reciprocating element whose movement is to be controlled, and it is the principal object of this invention to provide such a spring.

While my anti-surge spring may be of the helically coiled type, it is not to be confused with such springs having a dual-rate wherein certain of its convolutions are actively flexed only during a portion of the stroke and thereafter go "solid," leaving the remainder of the coils to support the load with increased stiffness relative to the stiffness of the entire spring prior to the first mentioned coils closing up to their "solid" condition.

In the further description of my invention two preferred examples of its application have been selected for illustrative purposes, in each of which the spring is shown as a helical coil spring acting in compression, wherein the two different load deflection rates are obtained by arranging one series of coils to have a different pitch than a second series of coils. It will be understood, however, that in certain of its broadest aspects the invention could be carried out in other ways, as for example, making some of the spring convolutions of heavier stock, different material, different heat treatment, etc.

Reference is now made to the drawing wherein:

Figure 1 is a longitudinal cross section through a unit fuel injector-pump of a well known type used in internal combustion engines, and embodying my invention in the plunger return spring which is shown therein in its relatively relaxed condition.

Figure 2 is a fragmentary view similar to Figure 1, but showing the spring in its maximum stressed condition.

Figure 3 is a fragmentary view in transverse section through the cylinder head portion of an internal combustion engine of the overhead valve type, illustrating application of my invention to a poppet valve return spring.

Referring now to the drawing in detail, and first to the Figures 1 and 2, the fuel injector pump illustrated includes a pump body 1 into which fuel is supplied under pressure through an inlet fitting 2 and is conducted through passages (not shown) to a reservoir chamber 3 formed in a lower extension or nut 4 threadedly secured to the lower end of the body 1. The nut 4 extends through a suitable opening in the cylinder head or other wall portion (not shown) of an internal combustion engine and terminates in a fuel discharge nozzle 5 within the firing space of the engine. Suitably supported within the nut and surrounded by the annular reservoir 3 is a bushing 6 which forms the pumping cylinder for a plunger 7 reciprocably slidable therein. Fuel supply and by-pass ports 8 and 9 extending through the wall of the bushing 6 are controlled by the plunger so as to admit and compress fuel within the pressure chamber 10 below the plunger for delivery to the nozzle 5 on each downward or pumping stroke of the plunger.

In the particular injector-pump illustrated, the upper end of the plunger is interlocked to an actuator member 11 of generally cylindrical form which is slidably guided in a skirt-like upper extension 12 of the body 1. The upper end 13 of the actuator is adapted to be engaged, in turn, by a rocker, cam, or other device (not shown) for driving it downwardly in timed response to the engine speed. An abutment 14 adjacent the upper end 13 of the actuator serves as a retainer seat for the coil compression spring 15 of my invention, the other end of which spring seats against the pump body surrounding the skirt 12. In Figure 1, the spring 15 is shown in its relatively relaxed condition, that is, with the plunger 7 fully retracted to the upper end of its stroke, which position of the parts is effected by the compressive thrust of the spring as the cam or other actuator driving means is withdrawn or otherwise completes its driving stroke. The spring 15 is of the helically coiled type having a series of convolutions 15' of greater helical pitch $a$ than the helical pitch $b$ of a second series of convolutions 15".

In Figure 2, which illustrates the condition of the spring 15 in its fully compressed condition at the end of the downward or pumping stroke of the plunger, it will be noted that the convolutions in both series 15' and 15" have remained "active," that is, in inter-spaced relation with each other although their relative pitch dimensions have been reduced to the amounts indicated by $a'$ and $b'$, respectively. Thus, it will be observed that the smaller pitch, or higher load deflection rate coils 15" do not close up to a solid condition at maximum compression, which would effect a change in the over-all load deflection rate of the spring, but instead remain flexibly responsive to plunger movement throughout the pumping and return stroke of the plunger. Because of their higher load deflection rate the closer pitch coils 15" exhibit a different natural frequency of vibration than that of the coils 15', and apparently because of these two different natural frequencies being embodied in the single spring any tendency of the spring to surge is effectively damped.

In Figure 3 the coil compression spring 115 is similarly arranged with a first series of convolutions 115' having a greater pitch than an adjacent series of convolutions 115". In this application the spring serves to return a poppet valve 20 whose stem 21 is slidably mounted in an engine cylinder head 22. Opening movements of the valve 20 are effected by an actuator in the form of a rocker 23 journaled at its fulcrum on a stud 24 secured to the cylinder head, the other end of the rocker being drivingly connected by a push rod 25 to an engine cam or other means (not shown) which operates in timed relation with the engine. As in the case of the previously described spring, the spring 115 operates in compression, being secured at its upper end to the valve stem by a retainer 26 and seating at its lower end against the cylinder head 22. Also as in the case of the previous embodiment, the closer pitch convolutions 115″ remain spaced from each other throughout the valve opening stroke from its closed position shown, and thus are at all times flexibly responsive or "active" along with the lower rate and larger pitch convolutions 115′. In the same way as previously described, the different natural frequencies of the two different pitch or deflection rate series of coils operate to damp tendencies of the spring to surge.

The actuator 13 of the Figures 1 and 2 embodiment may be similarly driven from the engine by the rocker 23 and push rod 25 of Figure 3.

While it is appreciated that various minor changes and arrangements of the parts may be made from those described, the spirit and scope of the invention is to be defined in accordance with the following claims.

I claim:

1. In the combination of a reciprocably driven member and reciprocal driving means therefor including resilient means, the improvement consisting of said resilient means having resilient first and second portions each active throughout the reciprocal stroke of said member and with substantially different load-deflection rates.

2. In the combination of a reciprocably guided member, a one-way driven actuator in driving engagement with the member, and a coil spring for effecting their return movement, the improvement consisting of said spring having two series of convolutions, each active throughout the reciprocatory stroke of said actuator, one of said series being of different pitch than the other.

3. In a device having a member movable in one direction to an extreme first position and in the opposite direction to an extreme second position, driving means including a one-way driven actuator in driving engagement with the member for effecting its movement toward said second position, and a spring resiliently opposing said movement of the member and effective to return the member to its said first position upon withdrawal of the actuator, the improvement consisting of said spring having first and second series of coils, the coils of each said series being interspaced from each other throughout movement of the member between said positions, said first series being of different pitch than said second series.

4. In a reciprocating type pump having a pumping plunger operating against a coil return spring, said spring having first and second series of convolutions of substantially different pitch, the convolutions of each series being active throughout each pumping stroke of the plunger.

5. In a unit fuel injector-pump for an internal combustion engine, means defining a pumping chamber including a pump body and plunger reciprocable therein, means for drivingly reciprocating the plunger including a coil compression spring having one of its ends connected to move with said last named means and its other end reacting against said body, said spring having a first resilient portion active throughout the plunger reciprocatory stroke and a second resilient portion also active throughout the plunger reciprocatory stroke but having a substantially different deflection rate than said first portion.

6. In a poppet valve operating mechanism for an internal combustion engine or the like, a poppet valve having a stem, means supporting said stem for reciprocation and means for reciprocating the stem including a coil compression spring having a plurality of convolutions each actively opposing longitudinal movement of the stem in one direction throughout its full operative stroke, certain of said convolutions having a load-deflection rate substantially greater than that of the remainder of said convolutions.

7. In a poppet valve operating mechanism for an internal combustion engine including an engine cylinder head, a poppet valve having a stem slidably reciprocable in said head, a helically coiled spring connected at its opposite ends to the stem and head and biasing the valve closed, and means for positively opening the valve a predetermined distance against said spring, said spring having a plurality of convolutions in spaced apart relation throughout the opening and closing movements of the valve, the helical pitch of certain of said convolutions being substantially greater than that of the remainder of said convolutions.

References Cited in the file of this patent

UNITED STATES PATENTS

| | | |
|---|---|---|
| 338,267 | Hearle | Mar. 23, 1886 |
| 2,260,606 | Clark | Oct. 28, 1941 |
| 2,387,264 | Holland | Oct. 23, 1945 |

FOREIGN PATENTS

| | | |
|---|---|---|
| 116,195 | Sweden | Apr. 9, 1946 |

OTHER REFERENCES

Mechanical Springs—Barnes Gibson—Raymond, 6400 Miller Ave., Detroit 11, Mich., 1944.